United States Patent
Sharp et al.

(10) Patent No.: US 8,659,828 B2
(45) Date of Patent: *Feb. 25, 2014

(54) POLARIZATION PRESERVING PROJECTION SCREEN WITH ENGINEERED PARTICLE AND METHOD FOR MAKING SAME

(75) Inventors: Gary D. Sharp, Boulder, CO (US); David A. Coleman, Louisville, CO (US); Joel Petersen, Valley Village, CA (US); Chris Rich, Ranchos Pales Verdes, CA (US); Ray Lewandowski, San Diego, CA (US)

(73) Assignee: RealD Inc., Beverly Hills, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/488,081

(22) Filed: Jun. 4, 2012

(65) Prior Publication Data
US 2012/0237675 A1    Sep. 20, 2012

Related U.S. Application Data

(63) Continuation of application No. 12/976,986, filed on Dec. 22, 2010, now Pat. No. 8,194,315.

(51) Int. Cl.
    *G03B 21/60*    (2006.01)
(52) U.S. Cl.
    USPC .......................................... 359/452; 359/443
(58) Field of Classification Search
    USPC ................ 117/22; 359/443, 452; 430/321
    See application file for complete search history.

(56) References Cited

U.S. PATENT DOCUMENTS

| | | | | |
|---|---|---|---|---|
| 2,524,286 | A * | 10/1950 | Dreyer | 359/487.02 |
| 3,652,317 | A * | 3/1972 | Della Porta et al. | 427/194 |
| 3,975,304 | A * | 8/1976 | della Porta et al. | 502/178 |
| 5,672,410 | A * | 9/1997 | Miekka et al. | 428/148 |
| 6,369,944 | B1 * | 4/2002 | Zeira | 359/452 |
| 7,068,427 | B2 * | 6/2006 | Hopkins et al. | 359/443 |
| 2001/0005282 | A1 | 6/2001 | Etori et al. | |
| 2002/0034710 | A1 * | 3/2002 | Morris et al. | 430/321 |
| 2009/0190210 | A1 * | 7/2009 | Coleman et al. | 359/452 |

FOREIGN PATENT DOCUMENTS

| | | |
|---|---|---|
| JP | 10-104747 A | 4/1998 |
| JP | 10-206973 A | 8/1998 |
| JP | 2008-151815 A | 7/2008 |

OTHER PUBLICATIONS

International preliminary report on patentability of the international searching authority in co-pending PCT/US10/061939 mailed Jul. 5, 2012.

* cited by examiner

*Primary Examiner* — Clayton E LaBalle
*Assistant Examiner* — Kevin Butler
(74) *Attorney, Agent, or Firm* — Neil G. J. Mothew; Darlene K. Kondo (57) ABSTRACT

Polarization preserving projection screens provide optimum polarization preservation for 3D viewing. The projection screens additionally provide improved light control for enhanced brightness, uniformity, and contrast for both 2D and 3D systems. Generally, the disclosed method for providing a projection screen comprises embossing at least a first side of a first substrate to produce an optically functional material and then cutting the optically functional material into pieces to produce a plurality of engineered particles. The plurality of engineered particles may then be deposited on a second substrate to produce a substantially homogeneous optical appearance of the projection screen.

20 Claims, 4 Drawing Sheets

POLARIZATION PRESERVING PROJECTION SCREEN WITH ENGINEERED PARTICLE AND METHOD FOR MAKING SAME

CROSS-REFERENCE TO RELATED APPLICATIONS

This patent application is a continuation of and claims priority to application Ser. No. 12/976,986, entitled "Polarization preserving projection screen with engineered particle and method for making same," filed Dec. 22, 2010, now U.S. Pat. No. 8,194,315, the entirety of which is herein incorporated by reference.

TECHNICAL FIELD

The present disclosure generally relates to front projection screens, and more specifically, to polarization preserving front projection screens.

BACKGROUND

Modern three-dimensional ("3D") cinema systems increasingly rely on polarization as a means of delivering stereoscopic imagery to an audience. Most of these systems place polarization control elements at both the digital projector and the viewer, which in practice makes the screen a contrast and/or cross-talk determining component. Manufacturers of front projection screens generally attempt to strike a compromise between image brightness uniformity and Polarization Contrast Ratio ("PCR"). Relative lack of efficiency of current screens (which has been described as Total Integrated Scatter or "TIS"), along with inherent light loss of most 3D delivery systems, further call for high peak gain to meet standards for image brightness. Conventional "silver-screens," however, have performance deficiencies that are the result of several statistical variables, which make it virtually impossible to optimize PCR, gain profile and efficiency.

BRIEF SUMMARY

According to the present disclosure, a method for providing a projection screen may include embossing at least a first side of a first substrate to produce an optically functional material, cutting the optically functional material into pieces to produce a plurality of engineered particles and depositing the plurality of engineered particles on a second substrate to produce a substantially homogeneous optical appearance of the projection screen. The method may include embossing a second side of the first substrate to produce the optically functional material. The embossing on the first and second side of the first substrate may be substantially similar pattern or may be different patterns. The embossing may approximately hold a predetermined tolerance, wherein the predetermined tolerance may be based on at least a difference between long-range statistics and ensemble statistics of the projection screen. Additionally, depositing the plurality of engineered particles on the second substrate may provide a surface on the second substrate that substantially approximates the statistics of the embossed first substrate.

Disclosed in the present application is a projection screen with a substantially homogeneous appearance, wherein the substantially homogeneous appearance may be achieved through web shuffling. The projection screen may include a first substrate and a coating adjacent to the first substrate. The coating may include a plurality of engineered particles which may be produced by cutting an optically functional material into pieces and the plurality of engineered particles may be operable to primarily determine the scattering behavior of light and may be within a predetermined size range. The first side of the optically functional material may be embossed and/or the second side of the optically functional material may be embossed. Additionally, the coating may further include a surface operable to decouple the scatter profile from the polarization contrast ratio of the projection screen.

According to another aspect, the present application discloses a method for providing a projection screen. The method may include embossing at least a first side of a first substrate and embossing at least a first side of a second substrate. The method may further include laminating the first substrate and the second substrate together to produce an optically functional material. The optically functional material may be cut into pieces to produce engineered particles and the engineered particles may be deposited on a third substrate to produce a substantially homogeneous optical appearance of the projection screen. Additionally, the embossing on the first of the first substrate and the second side of the second substrate may produce substantially similar patterns. The embossing may hold a predetermined tolerance, wherein the predetermined tolerance may be based on at least a difference between long-range statistics and ensemble statistics.

These and other advantages and features of the present invention will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Generally, one embodiment of the present disclosure may take the form of a method for providing a projection screen using web shuffling. In this embodiment, the method may be achieved by embossing a substrate to create an optically functional material, creating particles of an approximate size range appropriate for the selected coating technology by dicing the optically functional material, and re-coating the particles on a screen substrate. In one exemplary embodiment, the particles may be diced diffuser particles and may be substituted for ball-milled aluminum typically used in a conventional spray painting process. In another exemplary embodiment, a virtually deterministic engineered particle with prescribed scatter statistics may rely primarily on web shuffling for the randomization needed to create a substantially macroscopic homogeneous appearance.

Another embodiment of the present disclosure may take the form of a projection screen with a substantially homogeneous appearance which may be achieved via web shuffling. The projection screen may include a substrate which may be coated with an optically functional material that includes engineered particles. The engineered particles may be created by dicing double-side coated diffuser material on a carrier substrate. The diced, engineered particles may then be deposited on a screen substrate to create a substantially homogeneous optical appearance of the screen substrate.

Yet another embodiment of the present disclosure may take the form of a projection screen with a substantially homogeneous appearance which may be achieved via web shuffling. The projection screen may include a substrate which may be coated with an optically functional material that includes engineered particles. The engineered particles may be produced by dicing a laminated structure. The laminated structure may include a first and second substrate with embossed layers on the outer surfaces of the laminated structure. The engineered particles may then by deposited on a third substrate to produce the substantially homogeneous optical appearance of the projection screen It should be noted that embodiments of the present disclosure may be used in a variety of optical systems and projection systems. The embodiment may include or work with a variety of projectors, projection systems, optical components, computer systems, processors, self-contained projector systems, optical systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the invention is not limited in its application or creation to the details of the particular arrangements shown, because the invention is capable of other embodiments. Moreover, aspects of the invention may be set forth in different combinations and arrangements to define inventions unique in their own right. Also, the terminology used herein is for the purpose of description and not of limitation.

Figure 1:
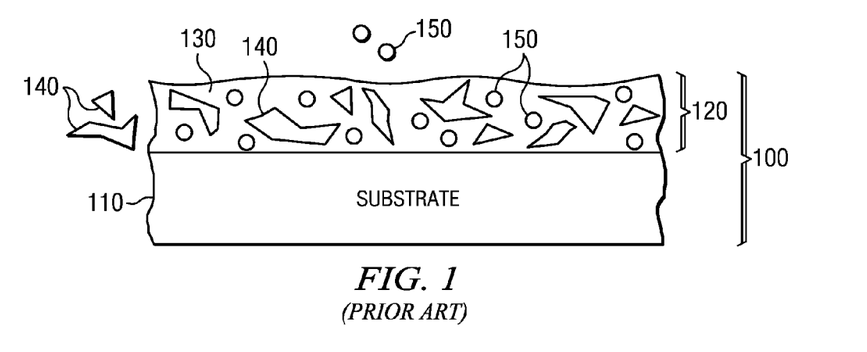
FIG. 1 is a schematic diagram illustrating the cross section of a conventional silver screen structure.

FIG. 1 is a schematic diagram illustrating the cross section of a conventional silver screen structure 100 used for stereoscopic 3D imaging. The conventional silver screen 100 may include a substrate 110 and a coating 120. Generally, conventional silver screens 100 may be fabricated by spray-painting the coating 120 onto the substrate 110. The coating 120 may include resin 130, aluminum flake 140 and matting agents 150. The flake 140 may be immersed in a transparent binder such as resin 130. Additionally, the aluminum flake 140 may be ball-milled aluminum particles or pigment. The matting agents 150 may be any type of particle to produce the desired optical characteristics and may be particles such as silica.

Various optical characteristics, either qualitative or quantitative, may be used to evaluate the optical performance of a projection screen such as the conventional silver screen 100. The optical characteristics may include measurements such as, but not limited to PCR, scatter profile, TIS, scattering from individual components of the projection screen, image brightness, image brightness uniformity, gain, gain profile and so on. The optical characteristics will be discussed in further detail below. The evaluation of conventional silver screens illustrates performance deficiencies with one or more non-optimized, aforementioned optical characteristics.

For example, conventional silver screens, generally, may demonstrate an on-axis circular PCR of 90:1 and may rarely exceed 120:1. The less than optimal on-axis circular PCR may be attributed to poor performance of the raw materials such as the substrate 110 and lack of process control when fabricating one or more of the coating 120, the aluminum flake 140 or resin 130. Additionally, the cross-talk term is characteristically angle neutral, so the PCR may also tend to degrade in proportion to the gain curve. The result may be screen performance that drives system level PCR and thus may dictate the quality of the stereoscopic 3D experience. System level PCR may be composed of the combined effect of most or all of the components. Currently, the system level PCR may be primarily determined by the screen PCR.

In FIG. 1, the individual components of the conventional silver screen 100 may contribute to the optical characteristics. For example, the aluminum flake 140 may serve as statistical scatterers, thus, when combined with the statistics of particle stacking may determine the macroscopic scatter characteristics of the conventional silver screen 100. Although low-cost ball-milled aluminum particles may beneficially broaden the scatter profile due to the relatively irregular shape/size of the aluminum particles, the aluminum particles may cause other issues from a polarization management perspective. When the previously discussed issues are coupled with the statistics associated with the coating process, current screen manufacturing may lack the control required to increase the diffusion angle without compromising PCR. More specifically, as the probability of a highly sloped surface increases, so too does the probability of a secondary reflection event, with the PCR suffering as a consequence.

One aspect of the present disclosure addresses the previously discussed limitations and may use a novel "web shuffling" technique in conjunction with roll-to-roll fabricated diffuser. Web shuffling is an averaging process, whereby engineered particles of a prescribed size may be transferred from a carrier substrate to a screen substrate using a statistical (or shuffling) process. According to the present disclosure, the shuffling process may be used to substantially homogenize one or more non-uniformities that may occur in the manufacturing of the raw diffuser stock. In one example, it may be understood that non-uniformities are substantially homogenized when the human eye cannot detect the non-uniformities at one or more of the following scales: just resolvable dimension, just resolvable area, just noticeable difference and so on. Each of the particle size and morphology, or both, may be optimally selected such that each may provide a suitable approximation to the desired macroscopic scatter statistics. The particles may be manufactured using roll-to-roll embossing technology, which produces the improved optical quality reflective diffuser performance. The web shuffling of the present disclosure may allow for the elimination of the need to manufacture roll-to-roll embossed diffuser on a wide-web that is substantially defect-free and extremely uniform.

The technique of web shuffling enables the substantial homogenization of subtle non-uniformities that can result in the tooling fabrication, roll-to-roll manufacturing process, and vacuum optical stack coating, without significantly sacrificing optical performance. The benefits of this approach for screen manufacturing can take many forms, including, but not limited to: (1) Spatially averaging large scale variations in diffuser profile characteristics; (2) Azimuthally averaging the effects of a directional diffuser (which can also vary spatially); and (3) from a yield standpoint, spatially averaging (or removing) gross defect material, which can include drum seams, large facets, scuffs, and other macroscopic defects in the embossing and optical coating process.

A benchmark for stereoscopic 3D front projection screen performance is an engineered surface with a highly reflective (e.g. aluminum) conformal layer, as described in the commonly-owned U.S. Patent Application Publication No. US 2009/0190210, which is hereby incorporated by reference. An engineered surface can be generated directly from a surface map file or a set of design rules, and thus can in principle provide a virtually ideal scatter profile, PCR, and efficiency. However, the fabrication of such a surface in sufficient size to build a cinema screen can be challenging.

In one example, the fabrication of the previously discussed surface may involve fabricating and maintaining a roll-to-roll embossing tool that may have one or more of the following features: 1) no drum-seams or no substantially significant drum-seams; 2) no gross defects or substantially insignificant gross defects either of which would avoid producing repeating screen artifacts (e.g., voids that produce mirror-like facets); and/or 3) a prescribed topography that is statistically uniform over the entire tool. In order to avoid visually objectionable diffraction artifacts and moire, the ideal design may also incorporate feature randomization (versus a true periodic structure on the roll-to-roll embossing tool). Moreover, the scatter statistics at the web edges must be well matched, so that butt-joined strips of film do not produce substantial visible intensity steps (when observing from most or all locations in a theatre).

Given the scale and cost of the raw diffuser stock, acceptable yield may be obtained if cosmetic defects resulting from the manufacturing and handling of the material are virtually eliminated. Tighter statistics can be obtained by using higher quality leafing pigments, which are optically flatter and tend to align in the plane of the binder surface. However, surfaces made with optical quality flat metallic leafing pigments have inherently narrow scatter profiles (e.g., 5-15 degree half-power angle), producing screens with higher TIS, but poor brightness uniformity. Furthermore, methods for broadening the scatter profile of optical quality pigment by controlling the extent of leafing often lack manufacturing robustness. Although a non-leafing pigment may be used, non-leafing pigment typically produces more of a bulk scatter, which is difficult to control and is again at the expense of PCR. Importantly, web shuffling in conjunction with roll-to-roll fabricated diffuser may address the limitations of both these technologies.

Figure 2A:
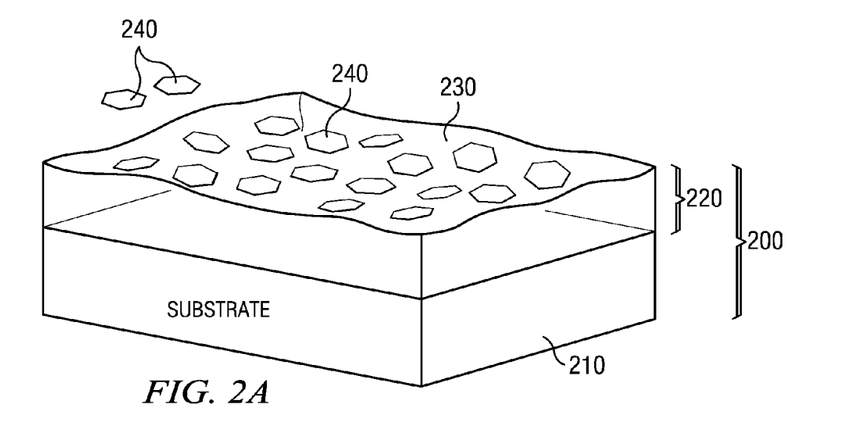
FIG. 2A is a schematic diagram illustrating a cross section of one embodiment of a structure for a projection screen, in accordance with the present disclosure.
Figure 2B:
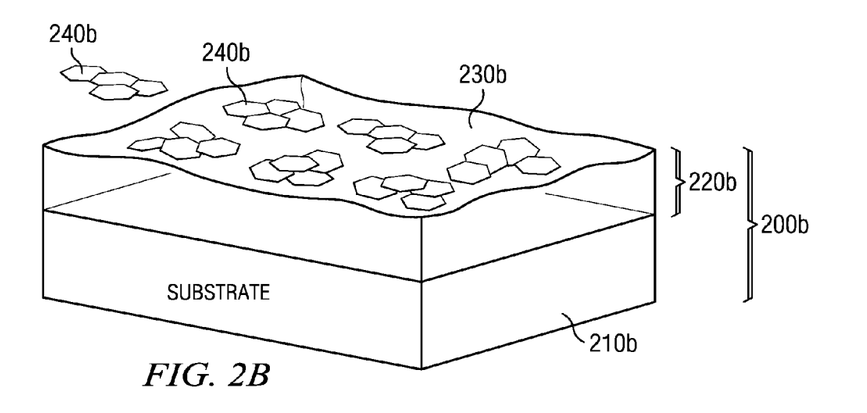
FIG. 2B is a schematic diagram illustrating a cross section of one embodiment of a structure for a projection screen, in accordance with the present disclosure.

FIGS. 2A and 2B are schematic diagrams illustrating a cross section of embodiments of a structure for a projection screen, in accordance with the present disclosure. FIG. 2A depicts a web-shuffled chop screen 200 which includes a substrate 210 and a web-shuffled coating 220. The web-shuffled coating 220 may include a fluid 230. The fluid 230 may contain a transparent binder resin such as, but not limited to PVC resin, enamel, polyurethane, acrylic, lacquer, and the like, and/or some form of dilution, which can be either solvent or aqueous based. The fluid 230 may serve as a carrier for the chop particles 240. The chop particles 240 may be engineered aluminum flakes or particles created from at least one or more of an embossed layer, a reflective coating and optical coatings. As illustrated in the embodiment of FIG. 2A, the chop particles 240 may be randomly distributed throughout the web-shuffled coating 220 such that the chop particles 240 may or may not be overlapping. Additionally, the chop particles 240 may be in the approximate size range of 100 microns to over five millimeters.

Additionally, FIG. 2B depicts a web-shuffled chop screen 200b which includes a substrate 210b and a web-shuffled coating 220b. The web-shuffled coating 220b may include a fluid 230b. The fluid 230b may contain a transparent binder resin such as, but not limited to PVC resin, enamel, polyurethane, acrylic, lacquer, and the like, and/or some form of dilution, which can be either solvent or aqueous based. The fluid 230b may serve as a carrier for the chop particles 240b. The chop particles 240b may be engineered aluminum flakes or particles created from at least one or more of an embossed layer, a reflective coating and optical coatings. As illustrated in the embodiment of FIG. 2B, the chop particles 240b may be distributed throughout the web-shuffled coating 220b such that the chop particles 240b may or may not overlap. Additionally, the chop particles 240b may be in the approximate size range of 100 microns to over five millimeters. The fabrication of the web-shuffled chop screens 200 and 200b will be described in detail below. Furthermore, in FIGS. 2A and 2B, the chop particles may be distributed such that the surface of the web-shuffled chop screens 200 and 200b may have little to no area between the chop particles.

Figure 3:
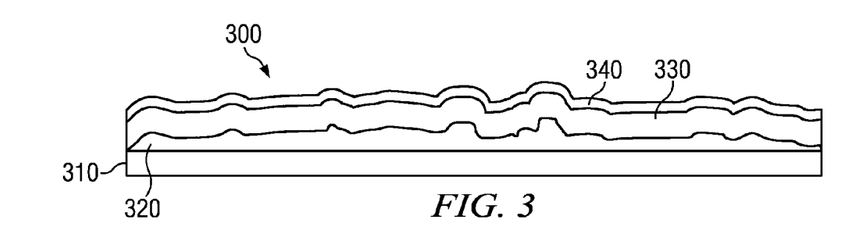
FIG. 3 is a schematic diagram illustrating one embodiment of a process for providing engineered particles, in accordance with the present disclosure.

FIG. 3 is a schematic diagram illustrating one embodiment of a process for providing engineered particles, in accordance with the present disclosure. FIG. 3 depicts one embodiment of a fabrication process 300 that may be used to create the chop particles 240 of FIG. 2. FIG. 3 includes a substrate 310, embossed layer 320, reflective layer 330 and optical coating 340. The embossed layer 320 may be fabricated from an initial continuous surface (not depicted in FIG. 3). Additionally, the initial continuous surface and embossed layer 320 of FIG. 3 may be measured and evaluated using similar functional specifications, each of which will be discussed below.

In one embodiment of a different fabrication process than the process depicted in FIG. 3, the first substrate may be coated on a first side and not on the second side. To clarify, the first side of the first substrate may include an embossed layer, a reflective layer and an optical coating, but the second side of the first substrate may not include any of the aforementioned layers. Additionally, a second substrate may include an embossed layer, a reflective layer and an optical coating on a first side of the second substrate. The first substrate and the second substrate may be laminated together such that the coated sides of the substrates face in an outward direction. Furthermore, the fabrication of the initial continuous surface will be discussed in further detail below.

The light scattering behavior of a surface fabricated according to the present disclosure may be the result of several statistical processes. Generally, the compound statistics may be the result of three manufacturing process steps; (1) Fabrication of the initial continuous surface, (2) Fabrication of discrete surface elements, and, (3) Coating of discrete surface elements. The following describes the fabrication processes and the parameters influencing first-order statistics, as well as embodiments that most closely approximate the behavior of the ideal surface.

Fabrication of Initial Continuous Surface

The initial surface may be fabricated using a number of manufacturing processes that substantially produce a predetermined topography. The preferred topography may be optically smooth, with slopes that vary spatially on a scale that is large relative to a wavelength of illuminating radiation. In one embodiment, the initial surface may be mastered using an analog photo-resist process, from which manufacturing tooling is generated. The fabrication of the manufacturing tool may also include intermediate tooling steps in addition to the analog photo-resist process. Additionally, there may be certain limitations to the nature of surfaces and associated statistics that may be realized when employing the analog photo-resist process, as in the case of optical recording of speckle patterns. In another example, direct-laser-recorded analog photo-resist processes may permit surfaces to be engineered, with fidelity limited primarily by the resolution of the laser spot and the characterization/repeatability of the optical recording transfer function.

Functional Specifications of Initial Continuous Surface and Diffuser

Design rules for achieving optimal performance for continuous surfaces (subject to specific theatre geometry) and as described in U.S. Pat. App. Pub. No. 2009/0190210 may be applied to produce the initial surface. In the case of a polarization-preserving front-projection screen and also as described in U.S. Pat. App. Pub. No. 2009/0190210, the desired functional specifications are well defined. In principle, so long as the functional specifications are substantially satisfied, the detailed distribution of surface topography is of no specific importance. The functional specifications may include, but are not limited to, PCR, gain profile shape, and visual appearance. The exception may include designs incorporating azimuth dependence, which is lost in the web shuffling process. Some basic characteristics of desired surfaces are described herein.

For naturally occurring diffuser surfaces, for example, non-engineered surfaces, the characteristics are frequently determined by physically measuring the bi-directional reflectance distribution function ("BRDF"), representing the differential reflectivity per solid angle. Such measurements can also be made with polarization sensitivity, giving a PCR profile. When a BRDF measurement is made over a sampling area that is large relative to the mean feature size of a scattering unit, the result may be a relatively smooth profile. Many such surfaces may have the desirable characteristics of a matte appearance and nearly Lambertian distribution, as the light collected by the eye is the result of many scattering events from features that are at/below the wavelength scale. This randomization may be beneficial by creating a uniform appearance (which may include elimination of optical affects due to the spatial coherence of the source at the screen), but may inefficiently use light, and may have a negative impact on polarization preservation.

For the subset of diffuser surfaces that preserve polarization well, there may be a close correspondence between the slope probability density function and the BRDF. This is because virtually all light reflected by the diffuser is the result of single scattering events. A viewer receives light from appropriately oriented contours of the surface which represent mirror-like specular reflections. To the extent that the angles are reasonably small (so that the differences between complex S and P reflections can be neglected), such interactions completely preserve the state of polarization locally. Also, selection of feature size and distribution may be important to avoid the grainy appearance (particularly at large observation angles) associated with low spatial density of appropriately sloped surface. This may be also an important consideration in the specular direction, where superposition of partially coherent light can cause speckle. One aspect of the present disclosure seeks to utilize web shuffling to capitalize on the surface control available in processes, such as UV embossing, for creating optimized surfaces.

Fabrication of Discrete Surface Elements

The fabrication of discrete surface elements may introduce a second statistical process. This process may affect the resulting screen behavior primarily through the statistics of particle size, and in particular, the size of particles relative to other characteristic features.

According to one aspect of the present disclosure and returning to FIG. 3, the embossed layer 320 may be diffuser roll-stock and may be fabricated using various processes such as, but not limited to roll-to-roll UV embossing, UV casting, thermal embossing and so on. The embossing process may be followed by vacuum deposition of at least reflective layers and optical coatings.

In one embodiment of the present disclosure, a thin substrate (e.g. in the approximate range of one micron to 200 microns) may be used to ensure minimal particle depth. The embossing may be on opposite sides of the substrate, or alternatively, a pair of single-side embossed diffusers may be laminated together. The former is advantageous from the standpoint of cost and overall thickness. Double-side UV embossing may be done sequentially, as access to one side of the web may be required for curing the UV coating. In one example, the UV coating may be acrylic. Additionally, technologies such as hot embossing may permit a one-step embossing process. In one exemplary embodiment, identical similar diffuser surface may be embossed on both sides of the substrate, and in another embodiment, a unique pattern may be embossed on each side. Relative to the latter, it may be anticipated that the subsequent coating process produces a spatial averaging of the two diffuser types to substantially produce a desired composite behavior.

The double-side diffuser may be subsequently double-side coated with a highly reflective (e.g. aluminum) coating, which may preferably be conformal to the underlying diffuser surface. Some embodiments may further involve coating the aluminum with a thin dielectric to passivate the aluminum. However, the diffuser may be anticipated to be protected from abrasion and chemicals by a dielectric overcoat, or binder, applied in a subsequent wet coating process step. In an exemplary embodiment the substrate refractive index may be approximately matched to that of the binder, thus substantially eliminating reflections from the substrate walls.

The net thickness of the raw diffuser stock may include the substrate, and the maximum combined thickness of the UV (e.g. acrylic) coatings. The thickness of the reflective coatings, which may be in the approximate range of 1,000-2,000 Angstroms, can be neglected. Assuming a diffuser with small feature sizes, the peak-to-valley height of the structure, along with a reasonable thickness of underlying material, may represent an approximate, effective thickness range of five to ten microns. As such, the particles may be manufactured with an approximate thickness range of 20-30 microns. Although the material may be highly flexible, and while it may have some distortion and curl when free-standing, it may conform to a screen substrate in subsequent wet coating.

After completing the optical coatings, the raw-diffuser stock may be chopped into small particles using, for example, conventional roll-die cutting processes. In some embodiments, one may choose a cutting process that reduces chipping of the diffuser coating at the perimeter. The chipping of the diffuse coating may produce a specular reflection from the exposed substrate in the absence of a binder over-coat. Moreover, in one embodiment, the chosen cutting process may produce vertical walls that are substantially smooth and free of cracks in order to minimize the potential impact of the walls on optical performance. Desirable size and geometry of a particle may depend upon one or more of the desired optical appearance, the context in which the screen is used (e.g. the visually resolvable area), the approximate characteristic dimension of a feature that web-shuffling is to homogenize, and the parameters of the particle coating process. In an exemplary embodiment, the material may be chopped into approximately hexagonal particles roughly one mm in size. In a cinema environment, this size may be appropriate considering the relative dimension of other features (e.g. a pixel of a digital projector is several millimeters in size, and there are acoustic through-holes, with roughly 1 mm diameter, neither of which is resolvable from a reasonable distance).

Figure 4:
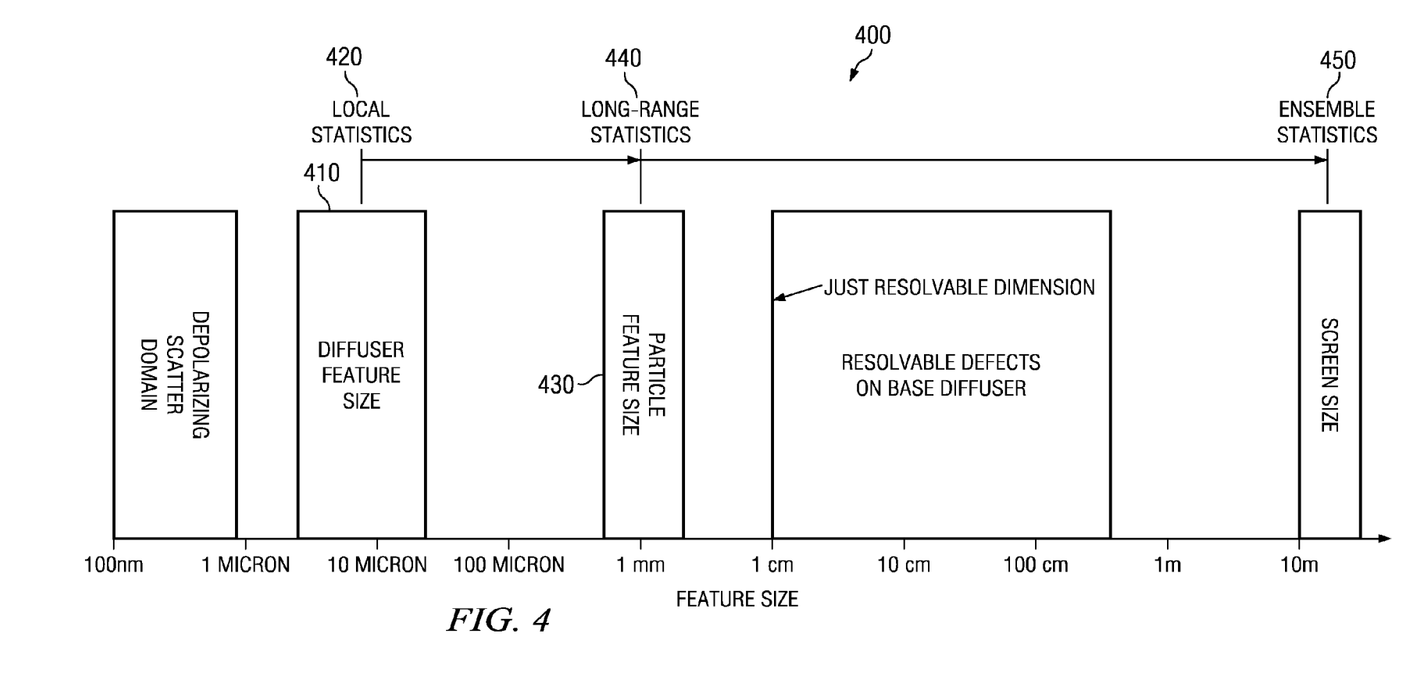
FIG. 4 is a schematic diagram illustrating a spectrum of feature sizes and the ranges associated with particular screen characteristics, in accordance with the present disclosure.

FIG. 4 is a schematic diagram 400 illustrating a spectrum of feature sizes and the ranges associated with particular screen characteristics, in accordance with the present disclosure. FIG. 4 includes a spectrum 400 of feature sizes and the ranges associated with particular screen characteristics. Diffuser feature size 410 may be configured to be significantly larger than a wavelength of illuminating radiation in order to assure that polarization can be locally preserved in reflection as indicated by the local statistics range 420. Within a range of diffuser feature sizes, interactions of light with the surface are described by specular reflections, in the long range statistics 440, with behavior accurately predicted by Fresnel's equations. When probing a surface at the long range statistics 440 scale (and moderately above), statistical scatter profiles are sparsely distributed (converging to deterministic at the extreme low-end) as they represent the most localized events. As the probe area increases, the scatter statistics become more complete and thus begin to describe the character of the macroscopic surface. At a preferred particle size within the particle feature size range 430, each unit may capture long-range statistics, where the scatter profile may be smooth and may be similar to a measured scatter profile obtained by probing a significantly larger area.

At still larger scales, such as the range of ensemble statistics 450, there may be visually resolvable defects, drift, and distortions to the scatter profile. These visually resolvable defects may be due to lack of process control in manufacturing both the tooling and the base material. Moreover, the diffuser can have directionality, which may also drift spatially. As such, there may be significant statistical variation between particles. In this case, it may be preferred that particles are small relative to the scales at which the eye can just begin to resolve structure. The scales at which the eye may begin to resolve structure may be referred to as a just-resolvable-dimension ("JRD"), or just-resolvable area ("JRA"). The latter may ensure that the screen does not exhibit significant granularity at the scale of a particle.

The ensemble may represent a significant number of possible outcomes measured at the scale of a finished screen. This may include a large number of positions/azimuth angles of the diffuser base material (both upright and inverted) utilized to produce a finished screen. Since spatial/azimuthal variations in the scatter profile of the base material are common, ensemble statistics are broadly distributed relative to any smaller scale statistics. Differences between ensemble statistics of the base material and that of the coated screen may be predominantly associated with the statistics of the coating process.

According to an exemplary embodiment, a particle may be large enough to capture long-range statistics, but may be smaller than any visually resolvable defect requiring homogenization. Such defects may be typically associated with structure in the screen that produces intensity variations that are small relative to the mean intensity. In this limit, suitable particle size may depend upon factors such as, but not limited to, viewing distance, particle-to-particle statistics, and any contribution from the coating process.

Figure 5A:
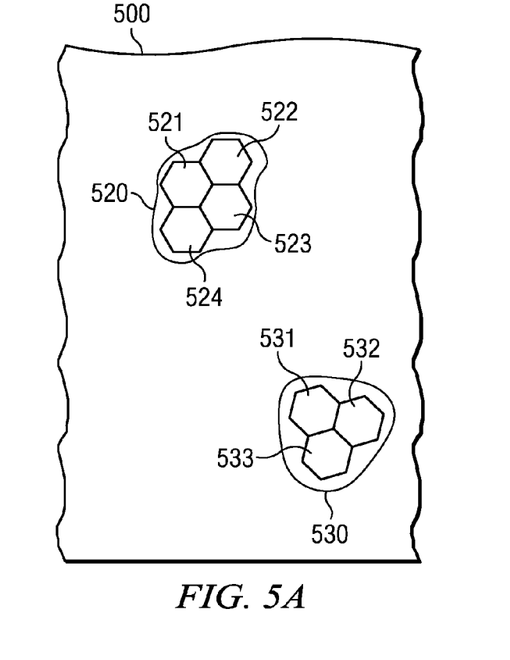
FIG. 5A is a schematic diagram illustrating one embodiment of a defect before web shuffling, in accordance with the present disclosure.
Figure 5B:
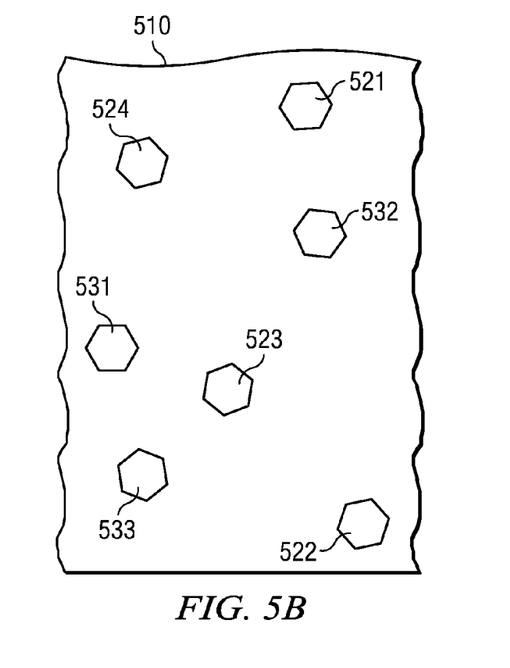
FIG. 5B is a schematic diagrams illustrating the embodiment of FIG. 5A of a defect after web shuffling, in accordance with the present disclosure.

FIGS. 5A and 5B are schematic diagrams respectively illustrating one embodiment of a defect before and after web shuffling, in accordance with the present disclosure. FIGS. 5A and 5B include defects on substrates 500 and 510, before and after web shuffling, respectively (not illustrated to scale). On substrate 500 (before web shuffling), defects or individual facets 520, 530 may be several hundred microns in diameter, and as such, can potentially be homogenized by web shuffling. Defect 520 may be cut into particles 521, 522, 523 and 524. Although the particles 521, 522, 523 and 524 are depicted as similarly sized approximately hexagonal pieces in FIG. 5, the defects may be cut into any size and/or shape. Likewise, individual facet 530 may be cut into particles 531, 532 and 533 and randomly distributed onto substrate 510, as depicted in FIG. 5B. Additionally, the material surrounding individual facets 520 and 530 may also be cut into pieces, but for purposes of discussion only in FIGS. 5A and 5B, the individual facets are depicted as such. After web shuffling, and as shown in FIG. 5B, substrate 510 includes particles 521, 522, 523, 524, 531, 532 and 533 randomly distributed on the substrate 510.

While defects as illustrated in FIGS. 5A & 5B may not be completely eliminated at the particle scale, reducing the area of facets can mitigate the impact on visual quality. At a larger scale, clusters of such defects, and clusters that repeat due to flaws in tool manufacturing, may be likewise homogenized. Clusters of small specular facets are often associated with the hot-spot effect, which may manifest as a spike in the gain profile along the specular direction. Re-coating may provide sufficient tilt randomization to substantially eliminate this effect.

According to another exemplary embodiment, differences between long-range statistics and ensemble statistics may be held to an approximate tolerance in the manufacturing of the base diffuser material. To reduce or avoid unnecessary texture in the appearance of the finished screen, it may be preferred that the observed intensity step between any two adjacent particles of the ensemble (with any relative azimuth orientation) is at or below a just-noticeable-difference ("JND"). Typically, this may be approximately one percent of the mean intensity. Within this approximate range, and neglecting coating contributions to nonuniformity, such a surface may appear similar to the base diffuser. Web shuffling acknowledges that an intensity step at a boundary between adjacent particles may be significantly larger, but that the associated texture may not be visually objectionable provided that the approximate particle size is properly selected.

In another exemplary embodiment, scatter profiles measured on the scale of a JRA of the finished screen material may approximately capture the ensemble statistics of the raw diffuser. A goal of web-shuffling may be to reduce the scale required to capture ensemble statistics by averaging material in azimuth and position at the scale of a JRA. In a cinema environment, the average such dimension may be on the order of approximately one centimeter or larger for a low-contrast structure.

Satisfying the above may depend upon the nature of the defect. The defect previously discussed may be physically large, and may be relatively low in amplitude; however, screens can contain other types of defects. For example, voids may be produced in UV embossing (or tool manufacturing) and may be attributed to bubbles. Further to this example, when the voids are metalized, the voids may produce highly reflective facets in the plane of the substrate. While such defects may be relatively small (on the order of a few hundred microns), and may not be visually resolvable, the efficiency of the defects may be high in the specular direction. The result may be a "sparkle", or localized spike in the gain profile, that may degrade the homogeneity of the screen appearance. Additionally, clusters of such defects, and clusters that repeat, for example, due to flaws in tool manufacturing, may likely be substantially homogenized.

An important performance metric may be the ratio of particle area to mean diffuser feature area, or particle-to-feature-ratio ("PFR"). The PFR may be an approximate measure of the ability of a particle to capture the desired long-range diffuser statistics. A benefit of particles manufactured according to the present disclosure may be that the particles may be arbitrarily large, whereas metal flake pigments may be limited in size due to their fragility. In a typical diffuser design the mean feature size may be approximately twenty microns, which may yield a PFR for a one millimeter hexagonal particle of over 2,000. In an exemplary embodiment, the mean feature size of the diffuser may be in the approximate range of ten microns or smaller. The integrated scatter profile with a PFR of this magnitude may appear smooth and may resemble an integrated scatter profile provided by integrating over substantially larger areas.

The minimum feature size possible may depend upon the optical recording process. In an image recording process (e.g. speckle) there may be challenges to resolving very small speckles due to the quality of the imaging system and opto-mechanical stability issues. Vibrations that occur during recording can tend to impact the quality of the master due to blur. However, it is reasonable to expect that mean feature sizes of approximately five microns may be possible with either image (e.g. speckle) recording or direct laser written engineered surfaces. A PFR of roughly 100 may be adequate to approximately capture the statistics of a randomized surface.

In the case of recording arbitrarily small features, the lower limit would be approximately one micron, which may ensure that polarization is preserved on reflection. It may be difficult, however, to employ the lower limit with the coating of discrete particles due to the influence of hard edges.

An embodiment of the present disclosure may allow particles to be manufactured while approximately maintaining an optimized size range, as opposed to metal flake pigments which may not be sufficiently thick to be manufactured and coated in sizes greater than about 50-100 microns. An embodiment of the present disclosure may further allow manufacturing of particles that are substantially similar in size, as opposed to the generally broad particle size distribution associated with metal flake pigments. Metal flake pigments with low PFR tend to "slump" when coated, increasing the peak gain, while robbing from the desired scatter into larger angles. The population of particles of a size near or below a diffuser feature size (PFR<10) can be disruptive when attempting to preserve the base diffuser profile, and PCR.

The in-plane aspect ratio (in-plane dimension divided by thickness dimension) of particles of the present disclosure may be consistently large for all particles (>30:1), which may ensure minimized disruption to the local diffuser normal-direction as a consequence of coating. The flexibility of the particles may further allow the particles to conform to the underlying substrate after drying. Yet another advantage of large particles of approximately consistent size may be the minimization of spatial edge density. The edges of particles may have features that may be at and/or below that of a wavelength, and as such, light interacting with these edges may not scatter in a manner that preserves polarization. In a crossed-polarizer microscope arrangement, individual particles appear brightly outlined, as if the image of the diffuser surface were high-pass spatial filtered. A crossed-polarizer microscope measurement allows one to visualize the PCR directly on the surface to identify the source of crossed polarizer leakage. The scatter from edges is generally "white" in angle space, such that this contribution to the resulting PCR may tend to follow the gain profile. Metal flake pigments typically contain a significant population of low PFR particles, which may contribute significantly to the density of such edges, thus causing significant loss in PCR. With an optimized coating process, PCR may tend to grow with particle size primarily due to the associated reduction in the area density of edges.

The present disclosure provides embodiments that may allow for the fabrication of discrete surface elements with substantially optimized optical performance. For example, the diffuser particles may be manufactured in a substantially statistically predictable manner. While the surface is inherently statistical, the PFR may be sufficient to ensure that a substantial number of particles approximately capture long-range statistics. The particles may be large and similar in size and/or aspect ratio, such that discretizing the surface may not substantially contribute to the degradation in screen gain and contrast performance. The substantial reduction and/or virtual elimination of this contributor may enhance the probability of the final screen substantially preserving the raw diffuser performance.

Coating of Discrete Surface Elements

A coating process of the present disclosure may produce a surface that approximates the surface of the initial continuous diffuser, with the averaging benefits of web-shuffling. This may be accomplished by using a relatively small number of large particles, in which most of the large particles may contain an approximate representation of the long-range statistics, and by tiling the large particles on the surface with minimal overlap. The tiling may substantially minimize shifts in the slope statistics due to tipping of particles, while providing high fill-factor (ratio of reflective area to total area), with substantially minimal waste of diffuser. Such a surface also may have substantially minimal edge density, thus substantially maximizing PCR.

Generally, the coating process may involve mixing the reflective particles into a fluid, containing a transparent binder resin and some form of dilution, in which the dilution may be either solvent or aqueous based. The mixture can be coated onto the substrate using any number of methods known in the art, with spray-painting being the most common. Spray painting may be more effective than printing methods for coating particles with larger dimensions.

In conventional projection screen manufacturing, an approximate size range of one to two meter wide strips of a plasticized substrate may be welded together, hung vertically, and stretched onto a frame. Next, spray rigs may raster the position of the gun until achieving adequate coverage. In one embodiment, the diffuser particles are substituted for ball-milled aluminum in a conventional spray painting, or gel-coating process. In an exemplary embodiment, the particles are substantially larger in dimension than conventional pigments, thus better capturing the desired scatter statistics.

The optical properties of the coated surface may depend upon several statistical variables, among which, may include, but are not limited to, the geometrical characteristics of the particles, the volume ratio of pigment to binder (or PBR), dilution, any additional additives such as matting agents, or flame retardants, and the detailed coating methodology.

In one embodiment of the present disclosure, the coating requirements may be based on, particle tipping statistics which in turn, may be primarily determined by intra-pigment topography, with coating being a substantially statistically predictable process. That is, the goal of the coating process may be to substantially minimize the role of particle tipping statistics on the scatter profile. An exemplary embodiment of the coating process may produce a substantially continuous metal surface at the optical interface, with substantially minimal resin overcoat which may provide mechanical integrity and/or durability. The optical interface may be the optically functional layer of particles, or the layer that actually receives and redirects projector light to the audience. The optical interface may be configured to be macroscopically planar to avoid depth-related appearance artifacts caused by stacking of particles, such as shadowing. In one example, the binder and substrate may be quasi index-matched materials, and the screen may be a random stack of infinitesimally thin continuous structured metallic patches, slightly tipped with respect to the substrate, that are separated in depth by at least the particle thickness. So in addition to being somewhat conformal to the surface micro topography, there may be surface steps due to the underlying particle stacking. At normal incidence, the separation of aluminum in the thickness direction may have relatively little impact. However, at large incidence angles, a portion of light may guide in the channel between the particles and between the metal layers of individual particles. This guided portion of light may represent a light loss, which may be preferred to any such light managing to propagate toward the audience. For example, the transmission of light from low optical density aluminum or pinholes would be highly depolarized. The stray light from such interactions may have a significant impact on PCR, and in this case, using an absorbing (e.g., black) diffuser substrate and/or an absorbing screen substrate can mitigate the situation.

In one example, the visual perception of screen structural appearance may be considered in terms of a just-resolvable-area ("JRA") of the screen. A desirable particle size may be small in comparison to a JRA, while capturing long-range statistics as described previously. Thus, a JRA may typically encompass a random stacking of many diffuser particles. Utilizing web-shuffling, these particles may be randomly distributed in azimuth, and may originate from random locations on both sides of the base diffuser. As the JRA of a screen may comprise many particles, with varying degrees of tipping and occlusion, the perceived intensity of scattered light can be described by the appropriately weighted average of the probability density function of each element. The perception of texture may depend upon, but is not limited to, the ratio of JRA to particle size, subtleness of web azimuth/spatial variations (or, relationship between long-range and ensemble statistics), and particle aspect ratio, any or all of which may influence tipping statistics. The screen texture can be considered a random image, where the particle size may primarily define the fundamental spatial frequency.

The ability to discern screen texture may be limited by the angular resolving power of the vision system optics, and the sensor (retina) resolution. Normal vision corresponds to recognizing letters that subtend an angular height of five minutes of arc, with each element of the letter subtending one minute of arc. Such tests may be performed using media with sharp edges, black on white, in a high ambient environment. Furthermore, this test may be for that part of the eye corresponding to the fovea of the retina. Outside of the zone of highest resolution, the visual acuity falls by approximately 50% in approximately two degrees. Moreover, visual acuity falls in reduced ambient lighting environments. The current cinema brightness standard is 14 fl for 2D presentation, and as low as 4.5 fl for 3D presentation, so visual acuity may degrade significantly primarily due to increased aberrations as the pupil dilates. Finally, visual acuity is a function of contrast. Subtle random modulation in intensity may be more difficult to resolve than periodic black/white bars. Since the peak sensitivity of the eye is at a low spatial frequency of 2-3 cycles/degree, a just-resolvable spatial frequency (associated with a JRA) shifts long as the modulation depth is decreased. At approximately 100% sinusoidal modulation, it may be possible to resolve approximately 7 mm at around 12 meters distance, but at approximately 10% modulation, it may only be possible to resolve approximately 13 mm, and at approximately 2% modulation, it may only be possible to resolve approximately 50 mm. Given the nature of random screen non-uniformities, it may be thus reasonable to assume that a JRA of screen surface may be between one and five centimeters at a typical cinema viewing distance. At dimensions smaller than a JRA, there may be a spatial averaging that occurs, associated with the sensitivity weighted modulation transfer function (MTF) of the vision system.

In one exemplary embodiment, azimuth/spatial variations of the ensemble may be subtle, such that long-range statistics and ensemble statistics may be similar. Here, the particle-to-particle variations may be generally small, so the ratio of JRA to particle area may be of lesser importance in maintaining a substantially homogeneous appearance.

From the standpoint of producing a screen that is substantially free of texture and/or appears matte and is substantially homogeneous in appearance at all larger scales, it may be generally preferred that ensemble statistics are virtually captured at the smallest possible scale. The suitable screen may achieve this at the scale of a JRA, which in some cases calls for a small particle. A characteristic of such statistics may be the tendency toward a scatter profile that is somewhat smooth and symmetric with respect to the normal.

In the absence of tipping, the net effect of web-shuffling may be a broadening of the diffuser profile on the scale greater or equal to a JRA. However, tipping of particles may introduce another broadening mechanism. In most coating processes, it may be assumed that the probability density associated with the axis (about which a particle tips when stacked) is substantially uniform in azimuth. Further, such a probability distribution may be virtually achieved at the scale of a JRA, and if so, the scatter profile at this scale may be virtually symmetric with respect to the normal. Additionally, it can be assumed that the direction of tipping may be substantially uncorrelated with the particle surface structure, which is reasonable given the nature of these particles. Under these conditions, the overall scatter profile may be given by the convolution of the spatial/azimuth averaged profile with the particle tipping angular distribution. Again, the tendency may be for tipping to broaden the scatter distribution.

Additionally, particles may be sufficiently rigid that they stack without bending, and in this case, there is a fixed tipping angle for each element. Alternatively, the forces on the particle may be high in the drying process, and the particles may be very flexible, and in this case, the tip angle may be a function of position within the particle. In either case, it may be preferred that particles stack with little resin above or between them. Accordingly, the coating process, in one exemplary embodiment of the present disclosure, may not attempt to control the orientation of the particles in the resin (as in e.g. non-leafing pigment in a thick binder). Rather, the coating process may produce a dense stack of particles lying nominally in-plane at the surface. High density in the thickness direction may substantially minimize particle tipping, the optical contribution of the binder, and additional surface depth, which can trap light, produce shadowing, multiple scatter events and so on.

Applications

The present disclosure may be applied to manufacturing any front-projection surface, whether or not it is required to preserve polarization. In 3D cinema, such screens are typically manufactured remotely, and then shipped and installed at the theatre. As described in the embodiments of the present disclosure, the surfaces can be applied to fixed structures on-site, either in temporary, single-event, or permanent installations. Applications for single theatrical events may be possible, in which a suitable structure such as a wall exists for application of the material, thus avoiding transportation of substrate, panels, and support structures. Prior to applying the final reflective coating, a sub-coat may be applied, which may planarize large features that could otherwise significantly disrupt the particle surface normal. In a temporary installation, this may be a relatively thick coating with high surface tension. The thick coating may be removed after use. Alternatively, substrate material can be applied to an existing structure using for example, a pressure sensitive adhesive, which may be subsequently coated with particles of the present disclosure.

In a web-based manufacturing of screen material, particles can be randomly distributed on a screen substrate, which may contain an adhesive layer. This layer may be, but is not limited to, a pressure sensitive adhesive, a thermally-activated material, or a similar form of adhesive. The particles that contact the adhesive may be immediately adhered to the screen substrate, while those that do not contact the adhesive may be reclaimed. Other processes may be performed in a roll-to-roll process, such as, but not limited to, calendaring to flatten the material, encapsulation by a clear-coat, embossing and so on.

A benefit of the present disclosure may be the application to irregularly shaped surfaces, such as domes. Domes are particularly challenging because they have compound curvature, making it difficult to apply a conventional planar screen. According to an embodiment, provided that curvatures are small on the scale of a particle, front projection surfaces can thus be applied to any surface.

Generally, sound systems may be mounted behind the screen in front projection systems. This is the case for many cinema environments, and is also common in specialty installations and high-end home theatres. Acoustic transmission of most polymer substrates is good below one kHz, but begins to decrease at higher frequencies. To address this issue, an array of through-holes may be typically used to raise acoustic transmission (e.g. 5-6 db of attenuation at 16 KHz). Conventionally, perforated/seamed substrate may be spray painted with ball-milled aluminum. Due to the relatively large perforation size relative to particle size, there may not be a significant change in the diameter of the perforation as a consequence of coating.

High frequency acoustic transmission of a perforated substrate may depend upon the pitch, and to a lesser degree, the diameter of the hole. Using spray coating or gel coating, the distribution of particles deposited on the surface may be random. Given that the particles may be large relative to a perforation, the probability of covering over acoustic holes is significant. In the event that the particles and coating are thin, some acoustic benefit may still exist. However, the area fill-factor (ratio of metalized area to total area) of the coating process may be controlled, and in practice, is difficult to drive into the high 90% range fill factor. The random nature of the coating process can thus be utilized to introduce a statistical distribution of acoustically transparent openings. In order to substantially maximize the probability that a void in the coating may produce an acoustic opening, it may be preferred that the substrate is acoustically transparent, or at least has a fine pitch. Candidate substrates may include, but are not limited to, fine-pitch perforated polymers, and dense-weave fabrics of various fibers. In one embodiment, the substrate may be flat on the scale of a particle.

Figure 6:
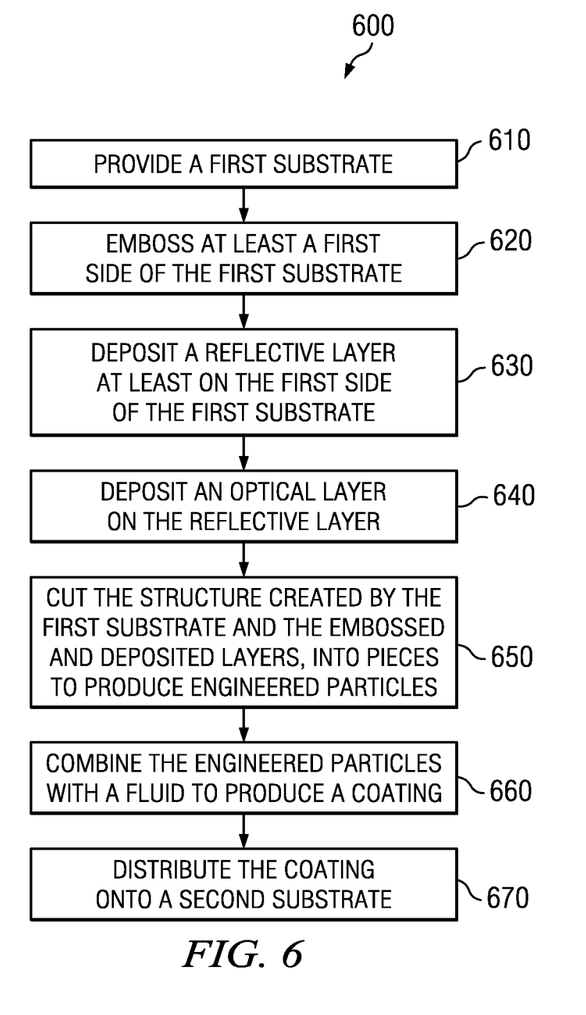
FIG. 6 is a flowchart illustrating operations of one embodiment of a method for providing projection screens, in accordance with the present disclosure.

FIG. 6 is a flowchart illustrating operations of one embodiment of a method for providing projection screens, in accordance with the present disclosure. Although the flowchart includes operations in a specific order, it may be possible to perform the operations in a different order, and it also may be possible to omit operations as necessary. The flow chart may begin with the operation of block 610, in which a first substrate is provided. Next in the operation of block 620, a first side of the first substrate may be embossed. Embossing the first side of the first substrate may be fabricated using any number of processes such as roll-to-roll UV embossing. In one embodiment, a first side of a second substrate may be embossed. Continuing this embodiment, the first substrate and the second substrate may be laminated together such that the embossed side of each substrate faces in an outwardly direction.

In the operation of block 630, a reflective layer may be deposited on the embossed. The reflective layer may be any type of reflective coating such as a metal including, but not limited to, aluminum. The reflective layer may be conformal to the embossed layer. Next, in the operation of block 640, an optical coating may be deposited subsequent to the reflective layer. The optical coating may passivate the reflective layer and may be a dielectric material such as, but not limited to, $SiO_x$, $MgF_2$ and so on. As previously discussed with respect to the operation of block 620, a second substrate may be embossed, and may also have a reflective layer deposited on the embossed surface of the first side of the second substrate.

Next, in the operation of block 650, the structure produced by the first substrate and the deposited layers may be cut into pieces to produce engineered particles. The engineered particles may be similar in size or may be any combination of sizes. In one embodiment, the engineered particles may have a predetermined, targeted size of approximately one millimeter. Additionally, the engineered particles may be cut into one or more approximately, predetermined shapes. In one embodiment of the present disclosure, the engineered particles may be cut into approximately hexagonal shapes.

In the operation of block 660, the engineered particles may be combined with a fluid to produce a coating. As discussed with respect to FIG. 2, the fluid may include a transparent binder resin such as a transparent binder resin such as, but not limited to PVC resin, enamel, polyurethane, acrylic, lacquer, and the like, and/or some form of dilution. The fluid may function as a carrier for the engineered particles. Next, in the operation of block 670, the coating may be transferred to a substrate in a coating process. The coating process may include spray painting or any spray and/or printing method known in the art.

As may be used herein, the terms "substantially," "substantially approximate(s)," "substantially minimize(s)," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for providing a projection screen, the method comprising:
    embossing at least a first side of a first substrate to produce an optically functional material;
    cutting the optically functional material into pieces to produce a plurality of engineered particles; and
    depositing the plurality of engineered particles on a second substrate to produce a substantially homogeneous optical appearance of the projection screen.

2. The method of claim 1, further comprising embossing a second side of the first substrate to produce the optically functional material.

3. The method of claim 2, wherein the embossing on the first and second side of the first substrate are substantially similar patterns.

4. The method of claim 2, wherein the embossing on the first and second side of the first substrate are different patterns.

5. The method of claim 1, wherein the embossing further comprises holding a predetermined tolerance, further wherein the predetermined tolerance is based on at least a difference between long-range statistics and ensemble statistics of the projection screen.

6. The method of claim 1, wherein depositing the plurality of engineered particles on the second substrate provides a surface on the second substrate that substantially approximates the statistics of the embossed first substrate.

7. The method of claim 1, further comprising distributing a reflective coating on at least a first side of the first substrate.

8. The method of claim 7, wherein the reflective coating is substantially conformal to the embossed surface of the first substrate.

9. The method of claim 7, further comprising distributing an optical coating on at least the first side of the first substrate and adjacent to the reflective coating.

10. The method of claim 9, wherein the optical coating is a dielectric coating operable to passivate the reflective coating.

11. The method of claim 1, wherein cutting the optically functional material further comprises producing similarly sized engineered particles.

12. The method of claim 1, wherein depositing the plurality of engineered particles on the second substrate substantially minimizes the effect of particle tipping statistics on the scatter profile.

13. The method of claim 1, further comprising distributing a coating is operable to substantially minimize the role of particle tipping statistics on the scatter profile of the coating, wherein the coating is produced by combining the plurality of engineered particles with a binder.

14. The method of claim 1, wherein distributing the coating further comprises producing a dense stack of the individual engineered particles lying substantially in-plane at the surface of the coating.

15. A method for providing a projection screen, the method comprising:
    embossing at least a first side of a first substrate;
    embossing at least a first side of a second substrate;
    laminating the first substrate and the second substrate together to produce an optically functional material;
    cutting the optically functional material into pieces to produce engineered particles; and
    depositing the engineered particles on a third substrate to produce a substantially homogeneous optical appearance of the projection screen.

16. The method of claim 15, further comprising combining the plurality of engineered particles with a binder to produce a coating.

17. The method of claim 15, wherein cutting the optically functional material, further comprises producing approximately vertical side walls of the plurality of engineered particles, wherein the side walls are substantially smooth.

18. The method of claim 15, wherein cutting the optically functional material further comprises producing approximately hexagonal engineered particles.

19. The method of claim 15, wherein depositing the plurality of engineered particles on the second substrate further comprises producing a substantially continuous metal surface at an optical interface with a substantially minimal resin overcoat.

20. The method of claim 15, wherein depositing the plurality of engineered particles on the second substrate substantially minimizes the effect of particle tipping statistics on the scatter profile.

* * * * *